Figure 1:
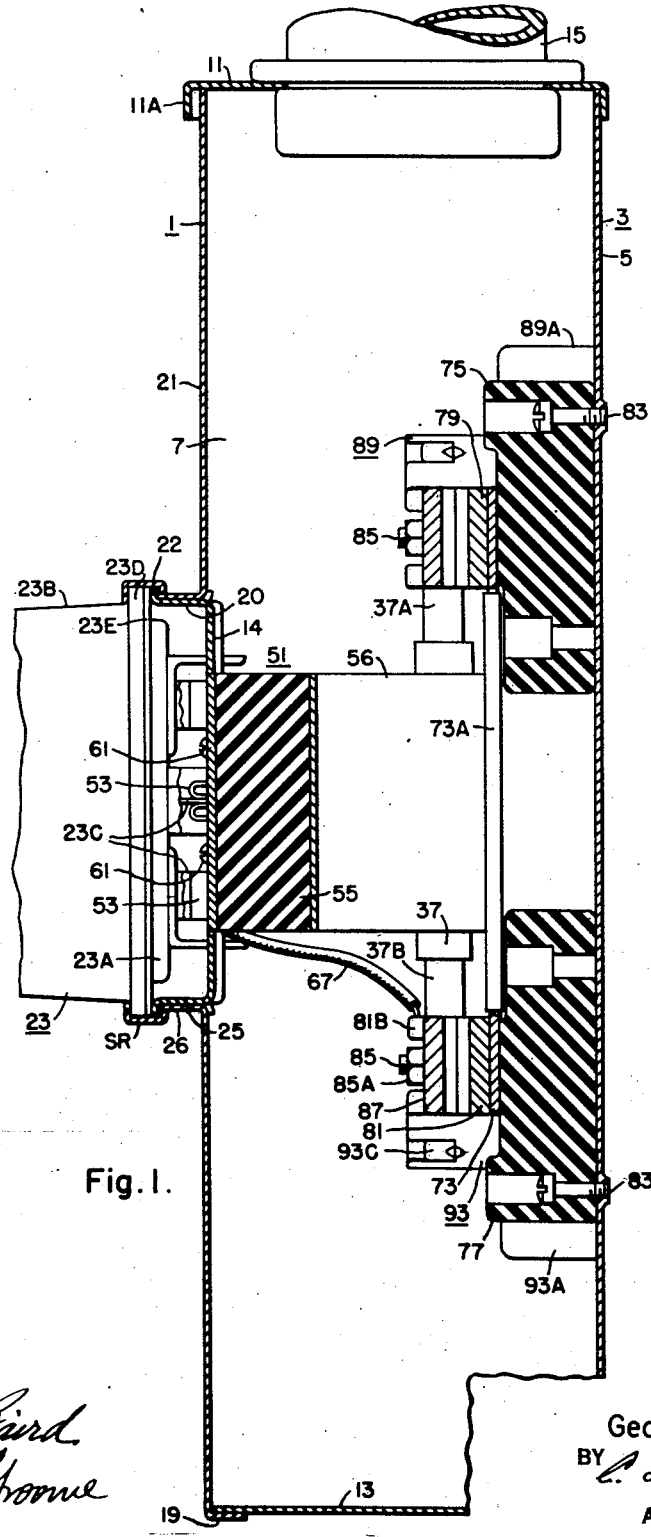

June 16, 1953 G. J. WEY 2,642,483
MOUNTING FOR ELECTRICAL INSTRUMENTS
Filed Sept. 6, 1951 2 Sheets-Sheet 1

WITNESSES:
Robert G. Baird
Wm. L. Groome

INVENTOR
George J. Wey.
BY C. L. Freedman
ATTORNEY

June 16, 1953  G. J. WEY  2,642,483
MOUNTING FOR ELECTRICAL INSTRUMENTS
Filed Sept. 6, 1951  2 Sheets-Sheet 2
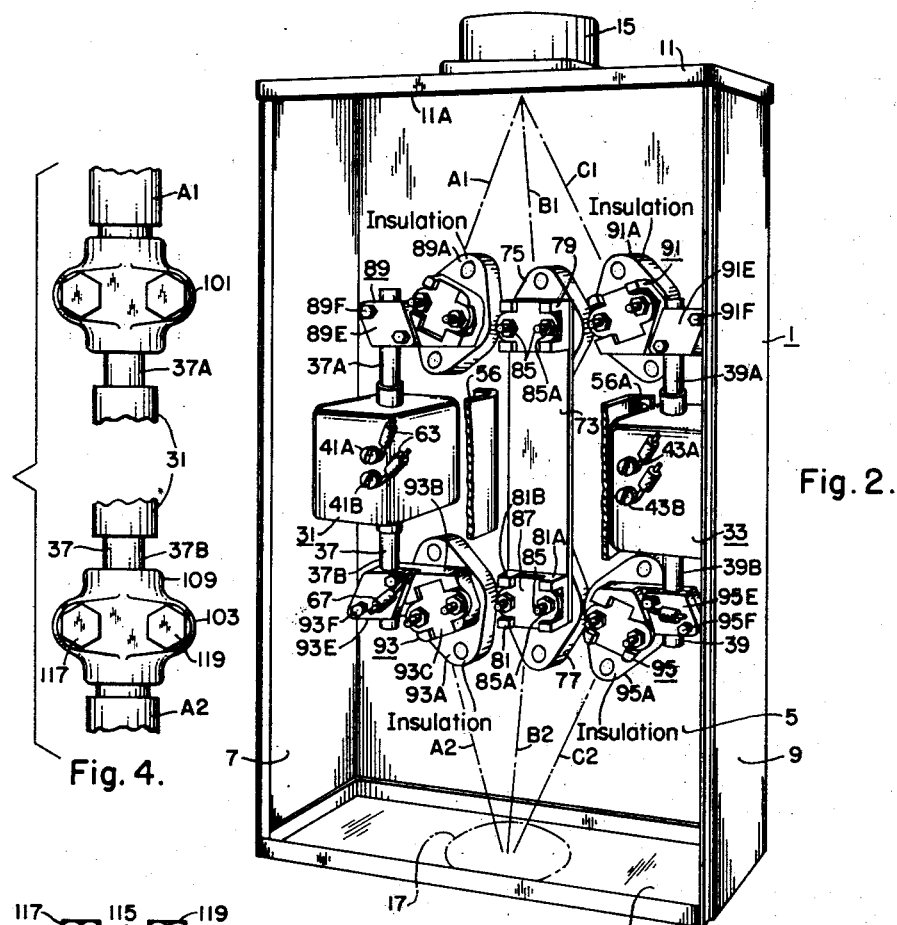
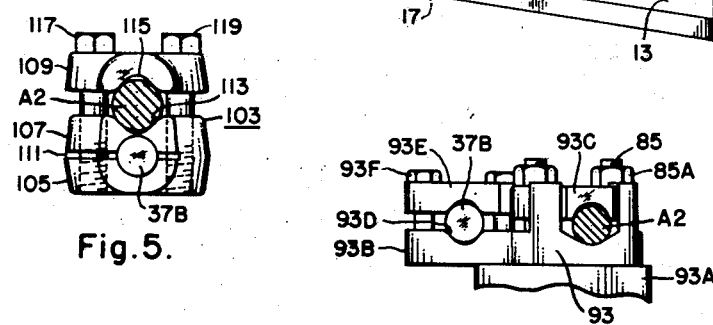
WITNESSES:
Robert G Baird
Wm. C. Groome
INVENTOR
George J. Wey.
BY
ATTORNEY Patented June 16, 1953

2,642,483

UNITED STATES PATENT OFFICE 2,642,483

MOUNTING FOR ELECTRICAL
INSTRUMENTS

George J. Wey, Jersey City, N. J., assignor to Westinghouse Electric Corporation, East Pittsburgh, Pa., a corporation of Pennsylvania Application September 6, 1951, Serial No. 245,391

12 Claims. (Cl. 175—298)

This invention relates to mountings for electrical instruments, and it has particular relation to mountings including transformers through which instruments are energized.

The invention may be employed for various instruments, such as electrical relays, electrical measuring instruments of the indicating type, and electrical integrating meters. Since the invention is particularly suitable for electrical meters, it will be discussed with reference thereto.

Electrical meters may be mounted in various ways. A number of conventional mountings are set forth in the "Electrical Metermen's Handbook" published in 1940 by the Edison Electric Institute of New York city. The invention will be discussed with particular reference to a meter installation of the detachable or socket type.

In accordance with the invention, an enclosure is provided for receiving line and load conductors. This enclosure is designed to receive an electrical meter which is to measure a quantity such as electric energy supplied by the line conductors to the load conductors. To this end, a socket including contact jaws for receiving the contact blades of a detachable meter may be associated with the enclosure.

The enclosure also contains transformer means through which energy is to be supplied from the conductors to the electric meter. Although the transformer means may include voltage transformers, the invention is particularly suitable for an installation containing current transformers, and it will be assumed that current transformers are here employed.

The current transformers are releasably retained within the enclosure. To this end, connector units are located in the enclosure. These connector units have provisions for receiving the line and load conductors and provisions for releasably receiving the primary leads of the transformer means. Preferably, the transformer primary leads are of rigid construction. The portions of the connector units intended to receive the conductors preferably are aligned with the openings through which the conductors enter the enclosure. This greatly facilitates the handling of heavy conductors.

The invention permits a contractor to install an enclosure on a building under construction. The line and load conductors may be introduced into the enclosure and may be secured to the connector units. When electric power is to be supplied to the building, the public utility company which is to supply the electric power may then install suitable transformers in the enclosure and mount an electric meter on the enclosure.

It is, therefore, an object of the invention to provide an enclosure for receiving electrical instruments wherein connector units are provided for receiving conductors entering the enclosure and for releasably receiving transformer leads.

It is a further object of the invention to provide an enclosure as defined in the preceding paragraph wherein transformers having rigid primary leads are employed.

It is a still further object of the invention to provide an electric meter mounting comprising an enclosure having openings through which conductors enter the enclosure, having transformer means located within the enclosure, having connector units through which the primary leads of the transformer means are releasably connected to the conductors, and having a terminal unit through which the secondary leads of the transformer means are connected to an electric meter.

Other objects of the invention will be apparent from the following description taken in conjunction with the accompanying drawings in which:

Figure 1 is a view in sectional elevation of an electrical mounting embodying the invention, Figure 2 is a view in perspective with parts broken away showing the base section of the mounting illustrated in Figure 1, Figure 3 is a detail view in elevation of a connector unit employed in the mounting of Figure 1, Figure 4 is a view in front elevation with parts broken away showing connector units embodying the invention, and Figure 5 is a view in end elevation showing one of the connector units of Figure 4.

Referring to the drawings, Figure 1 shows an enclosure which is in the form of a box having a cover section 1 and a base section 3. As shown in Figure 2, the base section 3 has a rear wall 5, side walls 7 and 9, a top wall 11 and a lower wall 13. The base section also has provision for permitting the entry or departure of conductors into or out of the enclosure. For example, a bushing 15 is secured to the upper wall 11 for reception of conventional conduit through which conductors may be supplied to the enclosure. In addition, the lower wall 13 may be scored, as represented by a line 17, to provide a circular weakened part which may be removed readily from the lower wall to permit attachment of conduit thereto.

Referring again to Figure 1, it will be noted that the cover section 1 provides a front wall 21 for the enclosure and has a flange 19 which may extend around three sides of the cover section. The walls 7, 9 and 13 of the base section are received within the flange 19 of the cover section. The upper part of the cover section fits within a flange 11A which is bent downwardly from the upper wall 11.

The enclosure of Figure 1 is designed for reception of an electrical instrument 23 which will be assumed to be a detachable or socket meter. As well understood in the art, the socket meter includes a base or pie-plate 23A which has a cup-shaped glass cover 23B releasably secured thereto. A meter is enclosed within the casing formed by the pie-plate 23A and the glass cover 23B. A plurality of contact blades 23C project from the pie-plate 23A and are insulated from each other. These contact blades constitute terminals for the meter which is secured to the pie-plate. The cover 23B and the pie-plate 23A have flanges respectively, 23D and 23E which are utilized in securing the meter to its mounting.

As shown in Figure 1, the cover section 1 has an opening 25 which is surrounded by a collar 26. The cover section may be formed of a suitable metal such as steel or aluminum, and the collar may be drawn or extruded from a sheet of the metal employed in fabricating the cover section.

A ring 20 is located within the collar 26. This ring 20 has a flange 22 which extends around the edge of the collar 26. In addition, the ring 20 has a crossbar 14 which extends diametrically across the ring. The crossbar 14, the ring 20, the flange 22 and the collar 26 may be identical with parts bearing the same reference characters shown in the Young Patent 2,242,637 which issued May 20, 1941.

Although voltage transformers may be mounted in the enclosures, the transformers 31 and 33 are assumed to be current transformers. The transformers 31 and 33 may be of any desired construction. Preferably, however, they have rigid primary leads. Although the transformers may have wound primaries, in the preferred embodiment of the invention illustrated in Fig. 2, the transformers are of the through type. Thus, the transformer 31 has a primary bar 37 which extends therethrough, and which may be a rigid, round copper bar. The parts of the primary bar 37A and 37B which project from the casing of the transformer may be considered to be the primary leads of the transformer 31. The central part of the bar 37 which is located within the casing of the transformer may be termed the primary winding of the transformer. Similarly, the transformer 33 has a through bar 39 which provides primary leads 39A and 39B. The transformer 31 has secondary terminals 41A and 41B, whereas the transformer 33 has secondary terminals 43A and 43B.

The socket 51 (Fig. 1) may be of any conventional construction. It will be understood that the socket 51 has a plurality of contact jaws 53 which are positioned for reception of the contact blades of the socket meter to be associated therewith. The positions of the contact blades of standard socket meters will be understood from a study of pages 31 and 32 of the aforesaid "Electrical Metermen's Handbook."

The contact jaws 53 are secured to an insulator 55 in any suitable manner. The insulator in turn is secured to a U-shaped bracket 56 in any suitable manner, and this U-shaped bracket has its legs attached to the wall 5 of the enclosure in any suitable manner as by means of machine screws 56A (Figure 2). As previously pointed out, the construction of sockets is well understood in the art as shown by the aforesaid "Electrical Metermen's Handbook." Screws 61 may secure the bar 14 releasably to the socket 51.

It will be understood that connections from the secondary terminals 41A, 41B, 43A and 43B (Figure 2) to the various contact jaws are provided by suitable conductors 63. Inasmuch as the transformers 31 and 33 are assumed to be current transformers, these connections provide current energization for the socket meter associated with the socket 51.

In addition, voltage energization for certain of the contact jaws is required. Such voltage energization conveniently is provided by means of conductors 67 which are electrically connected to the line or load conductors as required. Wiring connections for various sockets will be understood by reference to pages 33 to 53 of the aforesaid "Electrical Metermen's Handbook" which illustrate various meter wiring diagrams.

The base section of Figure 2 is designed for reception of line and load conductors of a circuit to which the electrical instrument is to be connected. The number of conductors and their arrangement depend on the nature of the circuit. For example, the circuit may be a single-phase, three-wire circuit; a poly-phase, three-wire circuit; or a poly-phase, four-wire circuit. Wiring diagrams for various circuits of this type are illustrated in the aforesaid "Electrical Metermen's Handbook."

In the embodiment of Figure 2, it will be assumed that three line conductors A1, B1 and C1 enter the base section through the bushing 15. Three load conductors A2, B2 and C2 leave the base section through a suitable opening such as that represented by the knockout section within the line 17. It will be assumed further that the line conductor B1 need not be coupled to the electrical instrument associated with the base section, but may be connected directly to the load conductor B2. It will be assumed further that the conductor B1 is not at ground potential and that it must be insulated from the base section.

A connection between the conductors B1 and B2 is established by means of an electroconductive strap 73 which is insulated from the base section by means of insulators 75 and 77. Connectors 79 and 81 are secured to the ends of the strap 73 for the purpose of releasably receiving the conductors B1 and B2 respectively. Referring to Figure 1, it will be noted that the insulators 75 and 77 are secured to the wall 5 in any suitable manner as by machine screws 83.

The connector 81 has a body 81A which may be constructed of electroconductive material in any suitable manner as by casting the body from copper. The body 81A may be secured to one end of the strap 73 and to the insulator 77 in any suitable manner as by means of a bolt 85 which passes through the insulator and the strap and is in threaded engagement with the body 81A. The bolt 85 projects from the body 81A and has a nut 85A in threaded engagement therewith.

Four parallel guide posts 81B are formed on the body 81A to define a cruciform recess for slidable reception of a cruciform cap 87. The cap 87 has a pair of openings through which the bolts 85 pass. Consequently, by operation of the nuts 85A, the load conductor B2 may be clamped between the cap and the body of the connector. The connector 79 is similarly constructed. If desired, an insulating sleeve 73A may be slipped over the central part of the strap 73.

The four conductors A1, C1, A2 and C2 are to be connected releasably to the primary leads of the transformers 31 and 33. To this end, four connector units 89, 91, 93 and 95 are provided. These connector units are secured to the wall 5 of the base section, through insulators 89A, 91A, 93A and 95A substantially in the same manner by which the connector 81 is secured to the wall 5.

primary bar of the associated transformer in spaced relationship relative to the enclosure.

Certain subject matter herein set forth is also set forth in the copending patent application of Ernest G. Johansson, Serial No. 245,408, filed concurrently herewith.

Although the invention has been described with reference to certain specific embodiments thereof, numerous modifications of the invention are possible.

I claim as my invention:

1. In a device for receiving an electrical instrument having first terminal means, an enclosure having a base section and a cover section, second terminal means in the enclosure to be connected to the first terminal means of an electrical instrument associated with the enclosure, transformer means positioned in the enclosure, said transformer means having primary leads, connector means positioned within the enclosure, said connector means including first auxiliary connection means accessible when the cover section is removed from the base section for releasably receiving said primary leads and second auxiliary connection means electrically connected to the first auxiliary connection means for receiving conductors to which the primary leads are to be connected, said transformer means having secondary terminals connected to the second terminal means, whereby an electrical instrument may be connected through the first and second terminal means to the secondary terminals.

2. In a device for receiving an electrical meter, an enclosure having a base section and a cover section releasably associated with each other, a plurality of spaced transformers each having rigid aligned primary leads positioned in the enclosure, said transformers being positioned with their primary leads parallel to each other, and a plurality of spaced connectors in the enclosure for releasably receiving and retaining the primary leads.

3. In a device for receiving an electrical meter, an enclosure having a cover section and a base section, said cover section having an opening permitting exposure of an electrical meter on each side of the cover section and being movable from the base section, said base section having an outlet, and a plurality of connector units located in the base section for facilitating connections between conductors passing through the outlet and a meter associated with the enclosure, each of the connector units including a first connector and a second connector for separately and releasably retaining respectively separate electrical conductors, said connectors being electrically connected to each other, and clamping means accessible when the cover section is moved from the base section for releasably clamping conductors in said connectors.

4. In a device for receiving an electrical instrument having first terminal means, an enclosure having a base section and a cover section movable relative to the base section for exposing the interior of the enclosure, said enclosure having an opening for reception of electrical conductor means, mounting means for mounting an electrical instrument on the enclosure adjacent the cover section with a substantial part of the electrical instrument exposed, transformer means positioned within the enclosure, said transformer means having primary and secondary leads, connector means disposed in said enclosure, said connector means having a conductor element, first releasable retaining means cooperating with the conductor element for releasably securing one of the primary leads thereto, said retaining means being inaccessible when the cover section is in its closed position and being accessible when the cover section is moved from said closed position, and second retaining means cooperating with the conductor element for securing thereto conductor means passing through said opening.

5. In a device for receiving an electrical instrument having first terminal means, an enclosure having a base section and a cover section movable relative to the base section for exposing the interior of the enclosure, said enclosure having an opening for reception of electrical conductor means, mounting means for mounting an electrical instrument on the enclosure adjacent the cover section with a substantial part of the electrical instrument exposed, transformer means positioned within the enclosure, said transformer means comprising two transformers having secondary leads and rigid parallel primary leads, connector means disposed in said enclosure for each of the primary leads, each of said connector means having a conductor element, first releasable retaining means cooperating with the conductor element for releasably securing one of the primary leads thereto, said retaining means being inaccessible when the cover section is in its closed position and being accessible when the cover section is moved from said closed position, and second retaining means cooperating with the conductor element for securing thereto conductor means passing through said opening.

6. In a device for receiving an electrical meter having first terminal means, an enclosure having a base section and a cover section movable relative to the base section for exposing the interior of the enclosure, said enclosure having an opening for reception of electrical conductor means, meter socket mounting means for mounting an electrical meter on the enclosure adjacent the cover section with a substantial part of the electrical meter exposed, transformer means positioned within the enclosure, said transformer means comprising two transformers having secondary leads and rigid parallel primary leads, connector means disposed in said enclosure for each of the primary leads, each of said connector means having a conductor element, first releasable retaining means cooperating with the conductor element for releasably securing one of the primary leads thereto, said retaining means being inaccessible when the cover section is in its closed position and being accessible when the cover section is moved from said closed position, and second retaining means cooperating with the conductor element for securing thereto conductor means passing through said opening, said meter socket mounting means having contact jaws electrically connected to the secondary leads.

7. In a device for receiving an electrical instrument having first terminal means, an enclosure having a base section and a cover section, second terminal means in the enclosure to be connected to the first terminal means of an electrical instrument associated with the enclosure, transformer means positioned in the enclosure, said transformer means having primary leads, connector means positioned within the enclosure, said connector means including first auxiliary connection means accessible when the cover section is removed from the base section for releasably receiving said primary leads and second auxiliary connection means electrically connected to the Referring more particularly to Figures 2 and 3, it will be noted that the connector unit 93 has a body 93B which may be cast from an electroconductive material such as cast copper. The body 93B is associated with a cap 93C substantially in the same manner by which the body 81A is associated with the cap 87. By operation of the nuts 85A, associated with the bolts 85 of the connector units 93, the line conductor A2 is clamped between the cap 93C and the body 93B. Preferably, the cap 93C and the body 93B have V-shaped grooves within which portions of the conductor A2 are received.

The body 93B also has an extension provided with a V-shaped groove 93D for reception of the primary lead 37B of the transformer 31. A cap 93E is releasably secured to the body 93B by means of machine screws 93F. Preferably, the cap 93E also has a V-shaped groove for reception of a portion of the primary lead 37B. By inspection of Figure 3, it will be noted that the machine screws 93F may be operated to clamp the primary lead 37B between the cap 93E and the body 93B. Also, the screws 93F may be removed in order to release the primary lead 37B from the connector unit.

The construction of the connector units 89, 91 and 95 will be understood from the description of the connector unit 93. It will be understood that the parts of the connector units are positioned for reception of the primary leads and for reception of the conductors A1, C1, A2 and C2. Inasmuch as the conductors A1, C1, A2 and C2 may be heavy, the portions of the connector units designed to receive these connectors preferably are aligned with the openings through which the conductors enters or leave the base section. This materially facilitates the handling of the heavy conductors. The alignment of the cap 93C and the associated part of the body 93B with the conductor A2 is shown clearly in Figure 2.

Parts of the connector units 89, 91 and 95 which correspond to the parts 93A, 93B, 93C, 93D, 93E and 93F of the connector unit 93 each will be identified by the appropriate reference character 89, 91 or 95 followed by the appropriate letter suffix.

The procedure for removing the transformers from the assembly illustrated in Figure 1 now may be set forth. It will be understood that the meter 23 is releasably secured to the cover section 1 by means of a conventional sealing ring SR. When this sealing ring is removed the meter 23 may be withdrawn from its associated socket.

Next, the screws 61 are removed in order to release the bar 14 from the associated socket. If additional screws, locks, or latches are employed for the purpose of securing the cover section 1 to the base section 3, these screws, locks or latches are also released. The cover section now may be removed from the socket and the base section 3.

Referring next to Figure 2, the machine screws 89F, 91F, 93F and 95F are released and the associated caps 89E, 91E, 93E and 95E are removed in order to free the primary leads of the transformers 31 and 33.

Although additional releasable attaching means for the transformers may be provided, it will be assumed that the transformers are secured to the enclosure only through their primary leads. Since the primary leads now are released, the transformers may be removed from the enclosure for servicing or replacement as required.

It should be noted that the construction is particularly suitable for separate installation of the enclosure and the removable unit. For example, a contractor erecting a building may secure the base section 3, together with the connector units and the strap 73 illustrated in Figure 2 in any suitable manner on the wall of the building which he is erecting. He may then connect the conductors A1, B1, C1, A2, B2 and C2, or certain of them, to the respective connector units. Finally, he may apply the cover section 1 (Figure 1) to the base section by means of machine screws or latches (not shown), and may cover the opening in the cover section by means of a disc (not shown) which is secured to the flange 22 by means of the sealing ring SR.

When the owner of the building desires to receive electrical service, the public utility company which is to provide the service may then install the transformer illustrated in Figure 2 within the enclosure previously provided by the contractor. The public utility company also would mount the meter 23 on the enclosure.

Figure 4 shows connector units which may be employed in place of the connector units 89, 91, 93 and 95 of Figure 2. In Figure 4, two connector units 101 and 103 are shown associated with the primary bar 37 of the transformer 31. It will be understood that similar connector units may be associated in a similar manner with the primary bar of the transformer 33 of Fig. 2.

Since all of the connector units may be similar in construction it will suffice to describe the construction of the unit 103. As shown in Fig. 5, the connector unit 103 has a lower part 105, an intermediate part 107 and an upper part 109 manufactured of an electroconductive material such as copper. Conveniently, the parts 105 and 107 may be formed by cutting a slit 111 partly or completely through a block of copper for the purpose of dividing it into the parts 105 and 107. In Fig. 5, the slit terminates short of the right-hand end of the associated block to leave a small connecting portion between the parts 105 and 107. This portion is sufficiently yieldable to permit the parts 105 and 107 to be clamped securely to the part 37B of the primary bar. It will be noted that the parts 105 and 107 have recesses proportioned to receive snugly spaced portions of the part 37B of the primary bar.

The intermediate part 107 also has a V-shaped groove 113 which cooperates with a V-shaped groove 115 provided in the upper part 109 for reception of the conductor A2. By urging the part 109 towards the part 107, the conductor A2, which is larger than the space provided by the grooves, may be securely clamped between the parts.

In order to secure the conductor A2 and the primary bar 37 securely in position, suitable clamping means are provided. These conveniently may take the form of a pair of cap screws 117 and 119 which have bodies passing freely through the parts 109 and 107 and which are in threaded engagement with the part 105. The heads of the cap screws engage the part 109. By operation of the cap screws the conductor A2 and the part 37B of the primary bar may be clamped securely between the associated parts. Also the cap screws may be released in order to permit ready removal of the conductor A2 and of the primary bar from the connector unit.

It will be understood that if the connector unit of Fig. 5 is positioned within the enclosure of Figs. 1 and 2, the connector unit is suitably insulated from the enclosure. If desired, the connector unit may be supported completely by the first auxiliary connection means for receiving conductors to which the primary leads are to be connected, said transformer means having secondary terminals connected to the second terminal means, whereby an electrical instrument may be connected through the first and second terminal means to the secondary terminals, the transformer means comprising a plurality of transformers symmetrically positioned relative to the second terminal means.

8. In a device for receiving an electrical instrument having first terminal means, an enclosure having a base section and a cover section, second terminal means in the enclosure to be connected to the first terminal means of an electrical instrument associated with the enclosure, transformer means positioned in the enclosure, said transformer means having primary leads, connector means positioned within the enclosure, said connector means including first auxiliary connection means accessible when the cover section is removed from the base section for releasably receiving said primary leads and second auxiliary connection means electrically connected to the first auxiliary connection means for receiving conductors to which the primary leads are to be connected, said transformer means having secondary terminals connected to the second terminal means, whereby an electrical instrument may be connected through the first and second terminal means to the secondary terminals, the second terminal means comprising a meter socket having contact jaws for detachably receiving the contact blades of a detachable meter.

9. In a device for receiving an electrical instrument having first terminal means, an enclosure having a base section and a cover section, second terminal means in the enclosure to be connected to the first terminal means of an electrical instrument associated with the enclosure, transformer means positioned in the enclosure, said transformer means having primary leads, connector means positioned within the enclosure, said connector means including first auxiliary connection means accessible when the cover section is removed from the base section for releasably receiving said primary leads and second auxiliary connection means electrically connected to the first auxiliary connection means for receiving conductors to which the primary leads are to be connected, said transformer means having secondary terminals connected to the second terminal means, whereby an electrical instrument may be connected through the first and second terminal means to the secondary terminals, the primary leads comprising rigid aligned conductors and said first auxiliary connection means comprising a pair of spaced aligned first connectors for releasably receiving and retaining said primary leads.

10. In a device for receiving an electrical instrument having first terminal means, an enclosure having a base section and a cover section, second terminal means in the enclosure to be connected to the first terminal means of an electrical instrument associated with the enclosure, transformer means positioned in the enclosure, said transformer means having primary leads, connector means positioned within the enclosure, said connector means including first auxiliary connection means accessible when the cover section is removed from the base section for releasably receiving said primary leads and second auxiliary connection means electrically connected to the first auxiliary connection means for receiving conductors to which the primary leads are to be connected, said transformer means having secondary terminals connected to the second terminal means, whereby an electrical instrument may be connected through the first and second terminal means to the secondary terminals, the primary leads comprising rigid aligned conductors and said first auxiliary connection means comprising a pair of spaced aligned first connectors for releasably receiving and retaining said primary leads, the second auxiliary connection means comprising a separate second connector secured to each of the first conductors.

11. In a device for receiving an electrical instrument having first terminal means, an enclosure having a base section and a cover section, second terminal means in the enclosure to be connected to the first terminal means of an electrical instrument associated with the enclosure, transformer means positioned in the enclosure, said transformer means having primary leads, connector means positioned within the enclosure, said connector means including first auxiliary connection means accessible when the cover section is removed from the base section for releasably receiving said primary leads and second auxiliary connection means electrically connected to the first auxiliary connection means for receiving conductors to which the primary leads are to be connected, said transformer means having secondary terminals connected to the second terminal means, whereby an electrical instrument may be connected through the first and second terminal means to the secondary terminals, the primary leads comprising rigid aligned conductors and said first auxiliary connection means comprising a pair of spaced aligned first connectors for releasably receiving and retaining said primary leads, the second auxiliary connection means comprising a separate second connector secured to each of the first conductors, the enclosure having an opening for reception of conductors, a plurality of said second connectors being aligned with said opening.

12. In a device for receiving an electrical meter, an enclosure having a cover section and a base section, said cover section having an opening permitting exposure of an electrical meter on each side of the cover section and being movable from the base section, said base section having an outlet, and a plurality of connector units located in the base section for facilitating connections between conductors passing through the outlet and a meter associated with the enclosure, each of the connector units including a first connector and a second connector for separately and releasably retaining respectively separate electrical conductors, said connectors being electrically connected to each other, and clamping means accessible when the cover section is moved from the base section for releasably clamping conductors in said connectors, the clamping means for one of the connector units being common to both of the conductors of the last-named connector unit, and a connector of a first one of the connector units being aligned with a connector of a second one of the connector units.

GEORGE J. WEY.

References Cited in the file of this patent
UNITED STATES PATENTS

| Number | Name | Date |
|---|---|---|
| 2,192,826 | Cole | Mar. 5, 1940 |
| 2,453,191 | Booth | Nov. 9, 1948 |